(12) United States Patent
Matsuda et al.

(10) Patent No.: US 12,202,075 B2
(45) Date of Patent: Jan. 21, 2025

(54) WELDED JOINT AND AUTOMOBILE COMPONENT

(71) Applicant: NIPPON STEEL CORPORATION, Tokyo (JP)

(72) Inventors: Kazuki Matsuda, Tokyo (JP); Shinji Kodama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 338 days.

(21) Appl. No.: 17/761,196

(22) PCT Filed: Oct. 5, 2020

(86) PCT No.: PCT/JP2020/037775
§ 371 (c)(1),
(2) Date: Mar. 17, 2022

(87) PCT Pub. No.: WO2021/066192
PCT Pub. Date: Apr. 8, 2021

(65) Prior Publication Data
US 2022/0379409 A1 Dec. 1, 2022

(30) Foreign Application Priority Data
Oct. 4, 2019 (JP) .................................. 2019-184025

(51) Int. Cl.
*B23K 31/02* (2006.01)
*B23K 9/23* (2006.01)
(Continued)

(52) U.S. Cl.
CPC ................ *B23K 31/02* (2013.01); *B23K 9/23* (2013.01); *B23K 2101/006* (2018.08); *B23K 2103/10* (2018.08)

(58) Field of Classification Search
CPC .... B23K 31/02; B23K 9/23; B23K 2101/006; B23K 2103/04; B23K 2103/10
See application file for complete search history.

(56) References Cited

U.S. PATENT DOCUMENTS
2020/0378420 A1* 12/2020 Matsuda .................. B23K 9/23

FOREIGN PATENT DOCUMENTS
JP 2013031878 A * 2/2013

OTHER PUBLICATIONS

M. D. Chapetti et al, "Controlled toe waviness as a means to increase fatigue resistance of automatic welds in transverse loading", International Journal of Fatigue, vol. 19, No. 10, pp. 667-675, 1997.

(Continued)

*Primary Examiner* — Phuong T Nguyen
*Assistant Examiner* — Dilnessa B Belay
(74) *Attorney, Agent, or Firm* — SOLARIS Intellectual Property Group, PLLC

(57) ABSTRACT

A welded joint comprising: a pair of steel base materials having a sheet thickness of 0.4 to 4.0 mm, and at least one of which has a tensile strength of 780 MPa or more; and a weld metal that welds the pair of steel base materials, wherein, when the weld metal is seen in plan view, a weld toe of the weld metal has peaks and valleys, an average distance in a direction orthogonal to a weld line direction between a top point of a peak and a bottom point of a valley that are adjacent to one another is 3.0 mm or less, and an average number of a total of peaks and valleys, at which the distance in the direction orthogonal to the weld line direction between the top point of the peak and the bottom point of the valley that are adjacent to one another is 0.1 mm to 3.0 mm, is 2 to 30/15 mm, and an automobile component having the welded joint.

11 Claims, 9 Drawing Sheets

(51) Int. Cl.
  *B23K 101/00*   (2006.01)
  *B23K 103/10*   (2006.01)

(56) References Cited

OTHER PUBLICATIONS

Meng Xiangfeng et al., "Welding Inspection Technology", Beijing University of Posts and Telecommunications Publishing House, Mar. 2016, p. 66-67.
T. Skriko et al, "Effects of weaving technique on the fatigue strength of transverse loaded fillet welds made of ultra-high-strength steel", Laboratory of Steel Structures, Lappeenranta University of Technology, Finland, Weld World, 2014, 58:377-387, Published online: Mar. 19, 2014.
English language translation of the following: Office action dated Feb. 13, 2023 from the SIPO in a Chinese patent application No. 202080065718.2 corresponding to the instant patent application. This office action translation is submitted now in order to supplement the understanding of the cited references which are being disclosed in the instant Information Disclosure Statement.
Chris Tobie et al, "Honda & Acura Body Repair News Update BRM Weld & Sectioning Guidelines Revisions", VeriFacts Guild 21 Presentation, Dec. 8, 2016, Slides 2 and 5.

* cited by examiner

WELDED JOINT AND AUTOMOBILE COMPONENT

TECHNICAL FIELD

The present disclosure relates to a welded joint and an automobile component.

BACKGROUND ART

For example, in the field of automobiles, improving the fuel economy by lightening the weight of the vehicle body, and improving the collision safety, are required for environmental protection. Conventionally, in order to devise lightening of the weight of the vehicle body and improving the collision safety, various technical developments have been made, such as optimization of the vehicle body structure is carried out together with using high-strength steel sheets whose sheet thicknesses are thin as structural members of the vehicle body, and the like. Note that welded joints having plural high-strength steel sheets as the base materials thereof also are included among automobile components.

Automobile components are used in environments that involve vibration or repeated external force loads. Therefore, in addition to the usual static tensile strength, sufficient fatigue strength is required of automobile components in order to withstand forces that are applied repeatedly.

Therefore, techniques that improve the fatigue strength of welded joints have been studied conventionally.

Further, Non-Patent Document 1 states, "By causing the weld metal (weld bead) to meander, cracks initiate from the fusion lines of the peaks (at the weld toe of the meandering weld metal, the regions where the weld toe pushes-out toward the base material side from the weld metal side) of the weld toe of the weld metal, and the cracks progress along the weld toe of the meandering weld metal, and the cracks unite in vicinities of the valleys (at the weld toe of the meandering weld metal, the regions near to the weld metal side), and, due thereto, the time required until coalescing of the cracks is extended, and the fatigue life improves."

Non-Patent Document 1: M. D. Chapetti, J. L. Otegui, International Journal of Fatigue, Vol. 19, No. 10, pp. 667-675, 1997

DISCLOSURE OF INVENTION

Technical Problem

The technique of Non-Patent Document 1 is a technique in which, in a case in which steel base materials whose sheet thicknesses are thick are welded, due to the cracks, which initiate at the fusion lines of the peaks of the weld toe, coalescing in vicinities of the valleys, the time needed until the cracks coalesce is increased, and the fatigue life improves. Namely, the technique of Non-Patent Document 1 is a technique in which the fatigue life improves in cases of welding steel base materials whose sheet thicknesses are thick and at which the proportion of the fatigue crack propagation life in the fatigue life is large. However, as compared with structures in which steel sheets whose sheet thicknesses are thick are welded such as ships or bridges or the like, in a structure in which steel sheets whose sheet thicknesses are thin are welded, it is easy for the fatigue cracks that initiate to become penetrating cracks because the dimensions are small and the sheet thicknesses are thin, such as with automobile members or the like. Therefore, the proportion of the fatigue crack propagation life in the fatigue life is small, and the fatigue crack initiation life is dominant. Therefore, in a case of welding steel base materials whose sheet thicknesses are thin, the fatigue life does not improve by a mechanism that is similar to that of a case of welding steel base materials whose sheet thicknesses are thick.

Thus, a topic of the present disclosure is to provide a welded joint having excellent fatigue strength even if a pair of steel base materials, whose sheet thicknesses are thin and at least one of which has a tensile strength of 780 MPa or more, are welded, and an automobile component having the welded joint.

Solution to Problem

Means for solving the problem include the following aspects.

[1]

A welded joint comprising:
a pair of steel base materials having a sheet thickness of 0.4 to 4.0 mm, and at least one of which has a tensile strength of 780 MPa or more; and
a weld metal that welds the pair of steel base materials,
wherein, when the weld metal is seen in plan view, a weld toe of the weld metal has peaks and valleys, an average distance in a direction orthogonal to a weld line direction between a top point of a peak and a bottom point of a valley that are adjacent to one another is 3.0 mm or less, and an average number of a total of peaks and valleys, at which a distance in the direction orthogonal to the weld line direction between the top point of the peak and the bottom point of the valley that are adjacent to one another is 0.1 mm to 3.0 mm, is 2 to 30/15 mm.

[2]

The welded joint of [2], wherein the average number of the total of the peaks and the valleys, at which the distance in the direction orthogonal to the weld line direction between the top point of the peak and the bottom point of the valley that are adjacent to one another is 0.1 mm to 3.0 mm, is 4 to 9/15 mm.

[3]

The welded joint of [1] or [2], wherein a ratio of a Vickers hardness of the weld metal with respect to a Vickers hardness of the steel base materials is 0.75 or more and 0.95 or less.

[4]

The welded joint of any one of [1] to [3], wherein at least one of the pair of steel base materials contains Al in an amount of 0.100 to 1.000% by mass.

[5]

An automobile component comprising the welded joint of any one of [1] to [3].

Advantageous Effects of Invention

In accordance with the present disclosure, there can be provided a welded joint having excellent fatigue strength even if a pair of steel base materials, whose sheet thicknesses are thin and at least one of which has a tensile strength of 780 MPa or more, are welded, and an automobile component having the welded joint.

BRIEF DESCRIPTION OF DRAWINGS

FIG. 6A is a cross-section of a peak.

FIG. 6B is a cross-section of a valley of the weld metal.

DESCRIPTION OF EMBODIMENTS

Figure 1:
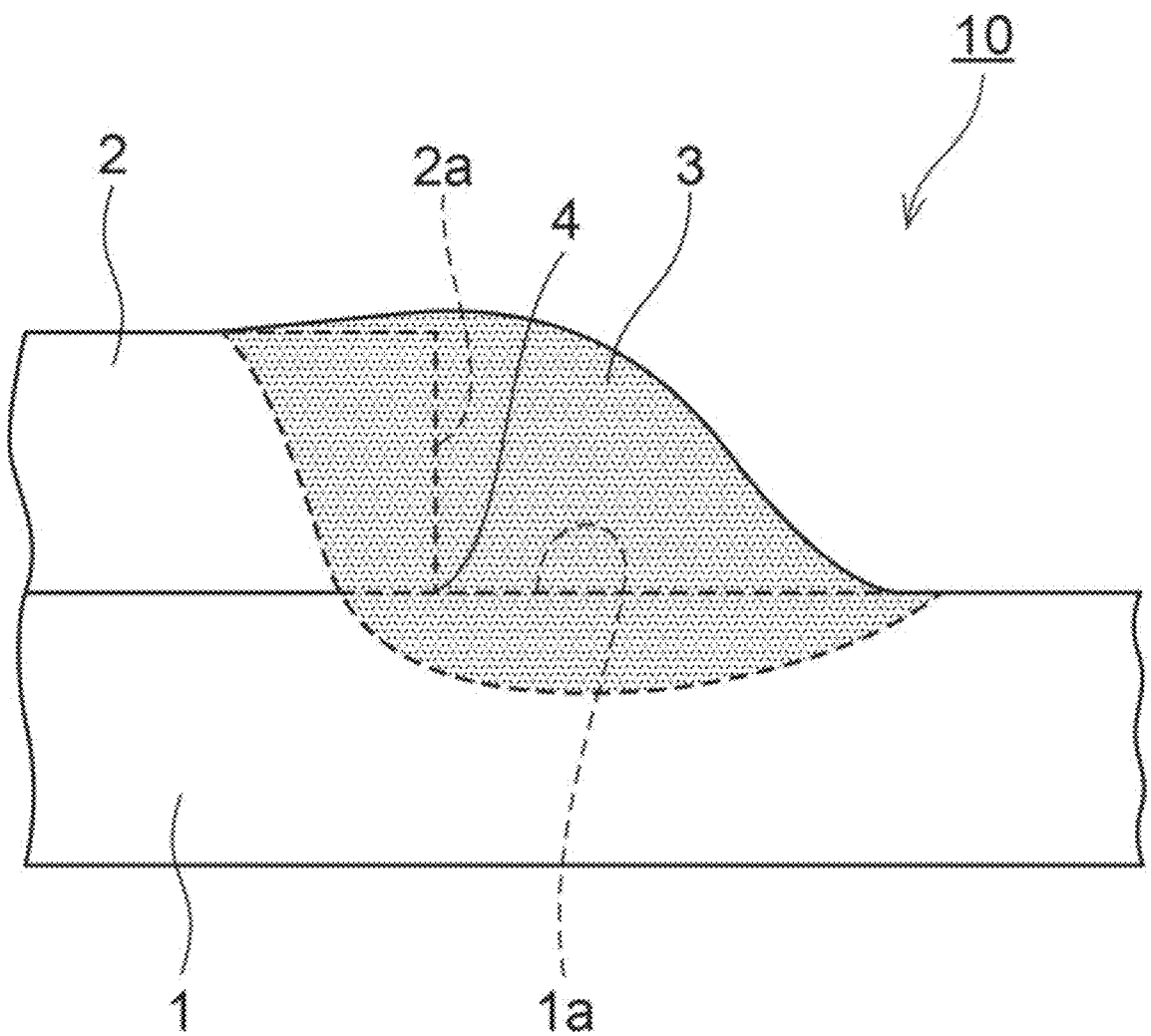
FIG. 1 is a cross-sectional view showing an example of a welded joint of the present disclosure.
Figure 1:
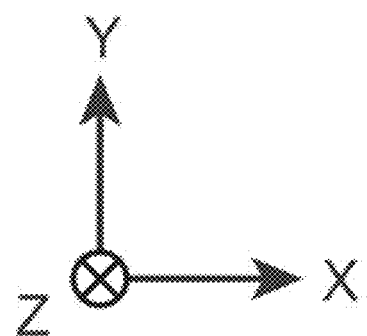

The present disclosure is described hereinafter.

Note that, in the present specification, numerical ranges expressed by using "to" mean ranges in which the numerical values listed before and after the "to" are included as the lower limit value and the upper limit value.

In a numerical range that is stated in a step-wise manner, the upper limit value or the lower limit value that is stated in a given numerical range may be replaced by the upper limit value or the lower limit value of another numeral range that is stated in a step-wise manner.

In a numerical range, the upper limit value or the lower limit value that is stated in a given range may be replaced by a value that is given in the Examples.

The word "process" is not only an independent process, and, provided that the intended purpose of the process is achieved even in a case in which the process cannot be clearly differentiated from other processes, that process is included in this word.

"Combinations of preferable aspects" are more preferable aspects.

Here, "peak" means the region at which the weld toe (concretely, the fusion line) juts-out from the weld metal side toward the base material side, when the weld metal is seen in plan view. Further, the "top point of the peak" means the extreme point of this region that juts-out most toward the base material side. Namely, the "top point of the peak" means the point at which the shortest length to the weld line from the weld toe (concretely, the fusion line), which juts-out from the weld metal side toward the base material side, is the longest. "Valley" means the region at which the weld toe (concretely, the fusion line) is near to the weld metal side, when the weld metal is seen in plan view. Further, "bottom point of the valley" means the extreme point of this region that is nearest to the weld metal side. Namely, "bottom point of the valley" means the point at which the shortest length to the weld line from the weld toe (concretely, the fusion line) that is near the weld metal side is the shortest.

"When the weld metal is seen in plan view" means observing the weld metal from the sheet thickness direction of the steel base material at the side where the peaks at the weld toe of the weld metal that is observed jut-out.

The welded joint of the present disclosure comprises:
   a pair of steel base materials having a sheet thickness of 0.4 to 4.0 mm, and at least one of which has a tensile strength of 780 MPa or more; and
   a weld metal that is a weld metal that welds the pair of steel base materials, and that, when the weld metal is seen in plan view, a weld toe of the weld metal has peaks and valleys, and an average distance in a direction orthogonal to a weld line direction between a top point of the peak and a bottom point of the valley that are adjacent to one another is 3.0 mm or less, and an average number of the total of the peaks and the valleys, at which a distance in the direction orthogonal to the weld line direction between the top point of the peak and the bottom point of the valley that are adjacent to one another is 0.1 mm to 3.0 mm, is 2 to 30/15 mm.

Owing to the above-described structure, the welded joint of the present disclosure has excellent fatigue strength even if a pair of steel base materials, whose sheet thicknesses are thin and at least one of which has a tensile strength of 780 MPa or more, are welded. The welded joint of the present disclosure was discovered from the following information.

For example, in the welding of automobile undercarriage members in which automatic welding by articulated robots is often carried out, replacing the welding wire for each steel base material that is welded is inefficient. Therefore, there are cases in which the weld metal when welding high-strength steel base materials of a tensile strength of 780 MPa or more, is under-matched (a state in which the weld metal strength is lower than the steel base material strength).

For example, at a weld metal (weld bead) that has been welded without carrying out welding such as welding with weaving or wave pulse welding or the like, fatigue cracks initiate from every place of the weld toe of the weld metal, i.e., fatigue cracks initiate from the positions at which the fatigue strength is the lowest and at which structural concentrations of stress and local concentrations of stress or strength or the like are combined. Therefore, it is easy for the fatigue strength of the weld metal to decrease.

Figure 6A:
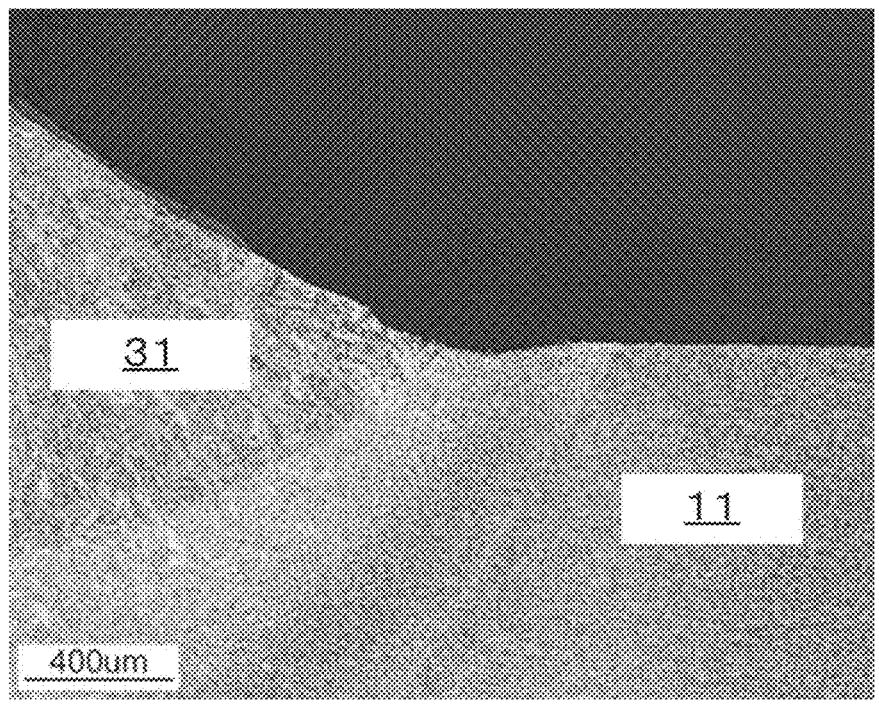
FIG. 6A is an example of the weld metal of the welded joint of the present disclosure, and is a photomicrograph after chemical etching of a cross-section of the weld metal at the time of welding with weaving, where
Figure 6B:
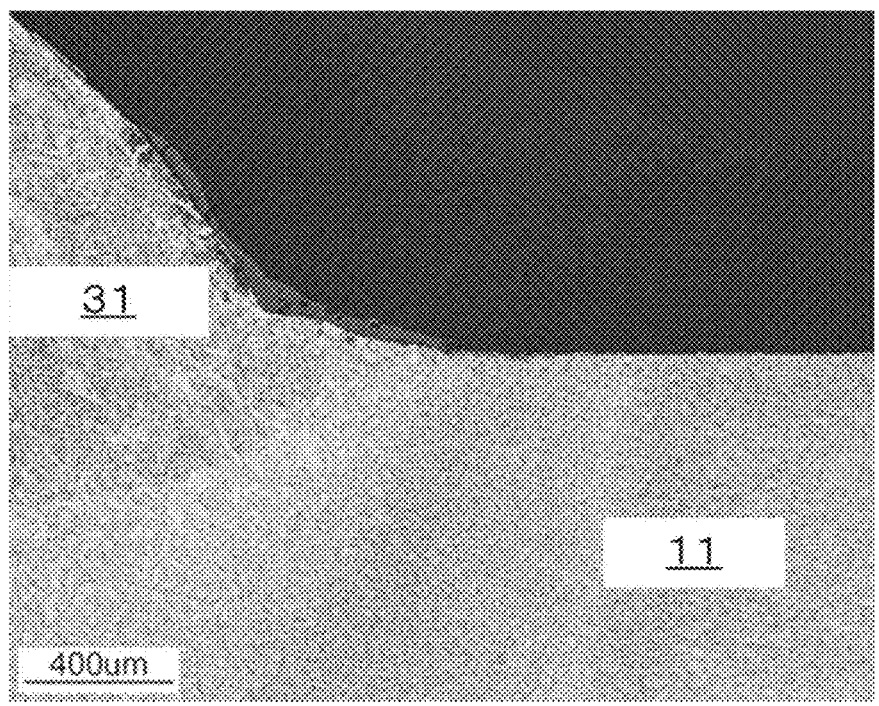
FIG. 6B is an example of the weld metal of the welded joint of the present disclosure, and is an optical microscope photograph after chemical etching of a cross-section of the weld metal at the time of welding with weaving, where

On the other hand, in a case of carrying out welding such as welding with weaving, wave pulse welding or the like for example, fatigue cracks initiate from the regions where the weld toe of the weld metal juts-out toward the steel base material side (the peaks), and the starting points are limited. At the valleys of the weld metal, the toe shape is sharp (see FIG. 6B), and there is a large concentration of stress, but because deformation is restrained by the weld metal at the periphery thereof, this is why the valleys do not become fatigue crack starting points. Moreover, at the valleys, the toe shapes are sloped gently (FIG. 6A), and the concentration of stress is reduced. Note that, in FIG. 6, 31 denotes the "weld metal", and 11 denotes the "steel base material".

Therefore, if the numbers of and the distances of the peaks and the valleys at the meandering weld toe of the weld metal at the time of welding steel base materials, whose sheet thicknesses are thin and at which the proportion of the fatigue crack initiatement life in the fatigue life is large, are set properly, the starting points of the fatigue cracks can be limited to the peaks, and moreover, concentrations of stress of the starting points can be reduced. Due thereto, the fatigue crack initiatement life of the weld metal is extended, and the fatigue strength improves.

From the above knowledge, it was found that the welded joint of the present disclosure has excellent fatigue strength even if a pair of steel base materials, whose sheet thicknesses are thin and at least one of which has a tensile strength of 780 MPa or more, are welded.

Further, if the steel base materials whose sheet thicknesses are thin are welded by welding with weaving, wave pulse welding or the like for example, there are cases in which the weld metal is pulled and the throat thickness decreases.

In particular, when the "throat thickness" of the weld metal decreases, in a case in which stress is applied from the exterior, it is easy for the stress that arises at the weld metal to increase. With steel base materials of a tensile strength of less than 780 MPa, it is often the case that the strength of the weld metal is higher than that of the steel base materials (over-matching), and therefore, it is difficult to affect the fatigue strength. However, with steel base materials whose tensile strength is 780 MPa or more, it is often the case that the strength of the weld metal is lower than that of the steel base materials (under-matching), and there are cases in which this leads to a decrease in the fatigue strength.

Thus, upon investigation, the disclosing parties discovered by way of experiment that, if a steel base material containing a proper amount (e.g., 0.100 to 1.000% by mass) is welded by welding with weaving, wave pulse welding, or the like for example, a decrease in the "throat thickness" of the weld metal is suppressed, and the throat thickness can be ensured.

The reason for this is assumed to be that, at the time of welding, the viscosity of the metal in which the A1, which has melted-out from the steel base material, has melted increases. Further, if a decrease in the "throat thickness" of the weld metal is suppressed, the stress that is applied to the weld metal is suppressed. As a result, the fatigue strength of the weld metal improves more.

Therefore, at the welded joint of the present disclosure, it is good for at least one of the pair of steel base materials to contain A1 in an amount of 0.100 to 1.000% by mass.

The welded joint of the present disclosure is described in detail hereinafter.

<Welded Joint>

The welded joint of the present disclosure is described in detail hereinafter with reference to the drawings.

Figure 2:
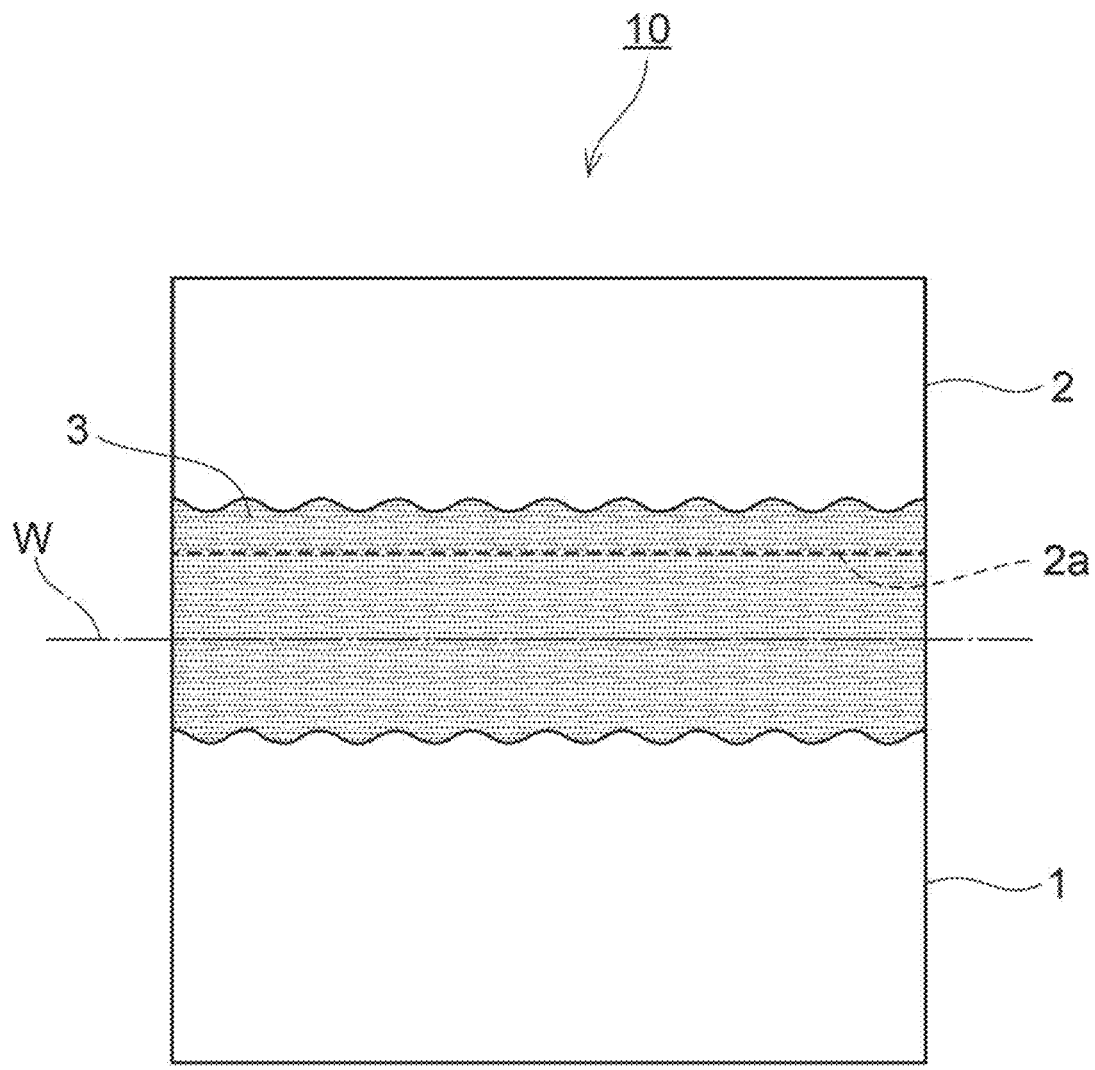
FIG. 2 is a plan view showing an example of the welded joint of the present disclosure.
Figure 2:
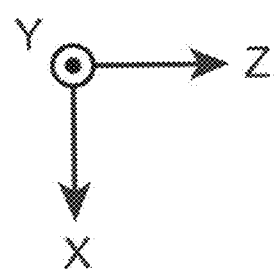

As shown in FIG. 1 to FIG. 2, for example, a fillet welded lap joint that has a pair of steel base materials that are superposed together (in FIG. 1, 1 denotes a first steel base material at the lower side, and 2 denotes a second steel base material at the upper side), and a weld metal (weld bead) 3 that extends along a corner 4 that is formed by an obverse 1a of the first steel base material 1 and an end surface 2a of the second steel base material 2, can be exemplified as a welded joint 10 of the present disclosure.

Here, in FIG. 1 to FIG. 2, a form of a fillet welded lap joint is illustrated in which the weld metal 3 extends along the corner 4 that is formed by the obverse 1a (a surface facing in the sheet thickness direction) of the first steel base material 1 and the end surface 2a (a surface facing in the direction orthogonal to the sheet thickness direction in a case in which the steel base materials are flat sheets for example). However, the present disclosure is not limited to this form. Concretely, the following forms are given as examples.

1) The form of a fillet welded joint in which the first steel base material 1 and the second steel base material 2 are disposed in an L-shape or a T-shape, and the weld metal 3 extends along the corner 4 that is formed by the mutually-facing surfaces (the surfaces that face in the sheet thickness direction) of the first steel base material 1 and the second steel base material 2.

2) The form of a butt welded joint in which end surfaces (surfaces that face in the direction orthogonal to the sheet thickness direction in a case in which the steel base materials are flat sheets for example) of the first steel base material 1 and the second steel base material 2 are disposed to about one another, and the weld metal 3 extends along the abutting portions.

3) The form of a welded joint that is formed by another known type of welding such as a groove joint, an edge welded joint or the like.

Note that FIG. 1 is a drawing in which the welded joint 10 is seen in a cross-section orthogonal to a weld line W (see FIG. 2) of the weld metal 3. Further, as shown in FIG. 1 and FIG. 2, a direction parallel to the weld line W is the Z-axis direction, a direction orthogonal to the Z-axis direction and parallel to the obverse 1a of the first steel base material 1 is the X-axis direction, and a direction orthogonal to the X-axis direction and the Z-axis direction and parallel to the sheet thickness direction of the first steel base material 1 is the Y-axis direction.

<Weld Metal>

[Toe Shape of Weld Metal]

Figure 3:
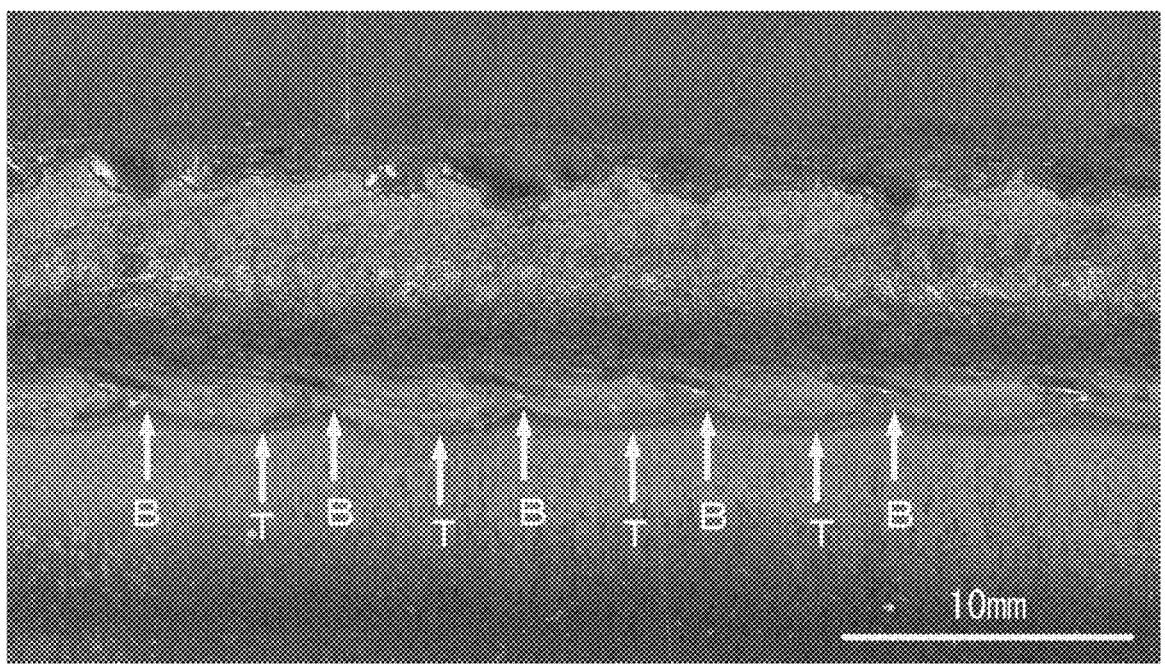
FIG. 3 is a plan view photograph showing an example of a weld metal of the welded joint of the present disclosure.

When the weld metal 3 of the present disclosure is seen in plan view, the weld toe of the weld metal 3 has peaks and valleys (see FIG. 3) in the weld line direction (the length direction of the weld metal, i.e., the weld bead). In FIG. 3, B denotes the "bottom points of the valleys", and T denotes the "top points of the peaks".

At the weld metal of the present disclosure, the average distance, in the direction orthogonal to the weld line direction, between the top point of a peak and the bottom point of a valley that are adjacent to one another (hereinafter also called "distance between a peak and a valley") is 3.0 mm or less. If the average distance between a peak and a valley in the direction orthogonal to the weld line direction exceeds 3.0 mm, it is easy for the shape of the weld metal 3 to become disordered locally, and it leads to a decrease in the fatigue strength. It is easy for local disordering of the shape of the weld metal 3 to occur in particular in cases of carrying out welding by welding with weaving.

Accordingly, the average distance between a peak and a valley in the direction orthogonal to the weld line is made to be 3.0 mm or less.

From the standpoint of improving the fatigue strength, the average distance between a peak and a valley is preferably 2.8 mm or less, and more preferably 2.5 mm or less, and even more preferably 2.0 mm or less.

The total number of peaks and valleys at which the distance, in the direction orthogonal to the weld line direction, between the top point of a peak and the bottom point of a valley that are adjacent to one another (hereinafter also called "number of undulations") is 2 to 30/15 mm (see FIG. 4). The number of undulations is the total number of the top points of peaks and bottom points of valleys that exist within a range of 15 mm in the weld line direction. Note that, in FIG. 4, B indicates the "bottom point of a valley", and T indicates the "top point of a peak". W1 denotes the "weld line direction", 31 denotes the "weld metal", and 11 denotes the "steel base material". A1 to A4 are described later.

If the distance between a peak and valley that are adjacent to one another is less than 0.1 mm, the effect of improving the fatigue strength by the peaks decreases, and therefore, peaks and valleys at which the distance between peak and valley that are adjacent to one another is less than 0.1 mm are not counted. Concretely, in a case in which the distance, in the direction orthogonal to the weld line direction, between the top point of an arbitrary peak (or bottom point of a valley) and the bottom point of one of the valleys (or top point of the peaks) among the two valleys (or the two peaks) that exist at the both sides is less than 0.1 mm, that aforementioned top point of an arbitrary peak (or bottom point of a valley) is not counted among the number of undulations.

Namely, the number of undulations, and the distance between a peak and a valley, are measured (see FIG. 5) while skipping peaks and valleys that are adjacent to one another at a distance of less than 0.1 mm. Note the meanings of the reference characters in FIG. 5 are the same as in FIG. 4.

Further, in a case in which the distance, in the direction orthogonal to the weld line direction, between the top point of an arbitrary peak (or bottom point of a valley) and the bottom points of the both valleys (or top points of the peaks) of the two valleys (or the two peaks) that exist at the both sides is less than 0.1 mm or exceeds 3.0 mm, that top point of an arbitrary peak (or bottom point of a valley) is not counted among the number of undulations. On the other hand, in a case in which the distance, in the direction orthogonal to the weld line direction, between the top point of an arbitrary peak (or bottom point of a valley) and the bottom point of at least one valley (or top point of a peak) among the two valleys (or the two peaks) that exist at the both sides is within the range of 0.1 mm to 3.0 mm, that top point of an arbitrary peak (or bottom point of a valley) is counted among the number of undulations.

Figure 4:
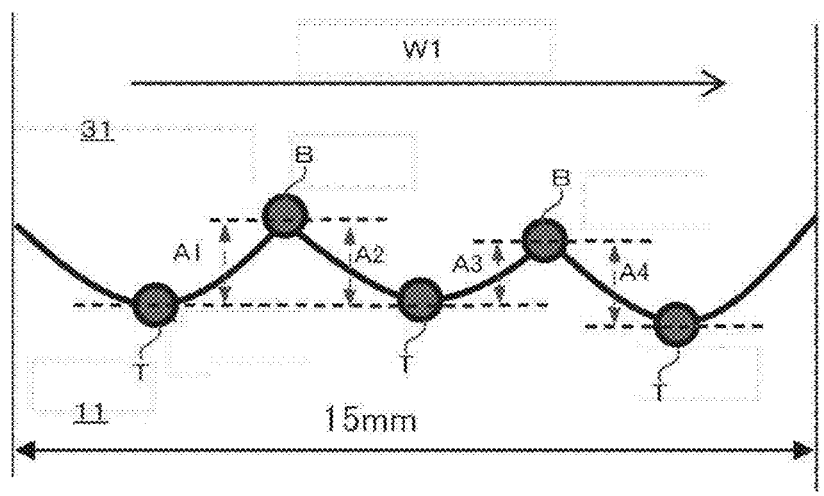
FIG. 4 is a schematic drawing for explaining a method of measuring the total number of peaks and valleys, and the distance between a peak and a valley that are adjacent to one another, at the weld metal of the welded joint of the present disclosure.

Here, in FIG. 4, in a case in which all of A1 to A4 are within the range of 0.1 mm to 3.0 mm, the "number of undulations" of the weld metal is 5/15 mm. Further, also in a case in which A1, A3 and A4 are within the range of 0.1 mm to 3.0 mm, and A2 exceeds 3.0 mm, the "number of undulations" of the weld metal is 5/15 mm. Further, in a case in which A1 and A4 are within the range of 0.1 mm to 3.0 mm, and A2 and A3 exceed 3.0 mm, the "number of undulations" of the weld metal is 4/15 mm.

Figure 5:
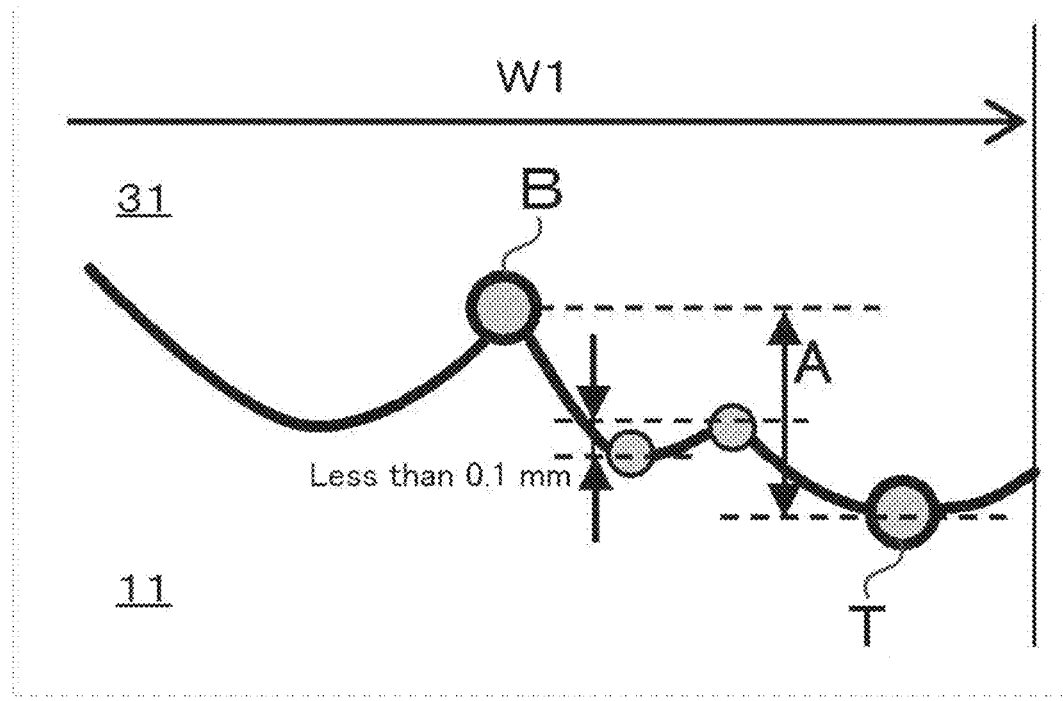
FIG. 5 is a schematic drawing for explaining the method of measuring the total number of peaks and valleys, and the distance between a peak and a valley that are adjacent to one another, at the weld metal of the welded joint of the present disclosure.

Note that, in FIG. 4 to FIG. 5, distances "A1 to A4" and "A", in the direction orthogonal to the weld line direction, between the top point of a peak and the bottom point of a valley that are adjacent to one another express X-axis direction distances between the peak and the valley (i.e., distances along the direction orthogonal to the weld line direction that corresponds to the X direction in FIG. 1).

Further, an arbitrary range of the weld metal 3 except for the respective 5 mm at the initial and final ends (at least within a range of a length of 15 mm or more in the weld line direction) is measured in accordance with the above-described standards, and the average values thereof are used as the number of undulations, and the distance between a peak and a valley.

With a number of undulations that is less than 2/15 mm, the function of localizing the starting points of the initiation of the fatigue cracks to the peaks is lost.

With a number of undulations exceeding 30/15 mm, the number of peaks that become starting points of initiation of fatigue cracks is too large, and the advantage of localizing the starting points of initiation of fatigue cracks to the peaks is lost.

Accordingly, the number of undulations is set to the above-described range. From the standpoint of improving the fatigue strength, the number of undulations is preferably 2 to 28/15 mm, and more preferably 3 to 15/15 mm.

The number of undulations is more preferably 4 to 9/15 mm, and by setting the number of undulations in this range, the fatigue strength improves more. The reason for this is assumed to be as follows.

By setting the number of undulations to 4 to 9/15 mm, it is easy for the regions where the initiation of fatigue cracks, which results from the structures of the valleys of the weld metal, is suppressed to extend to as far as ranges that are near the top points of the peaks.

Therefore, the starting points of the fatigue cracks are even nearer to the top points of the peaks whose toe shapes are smooth. It is assumed that, due thereto, the fatigue crack initiation life of the weld metal is further lengthened, and the fatigue strength is further improved.

Figure 7:
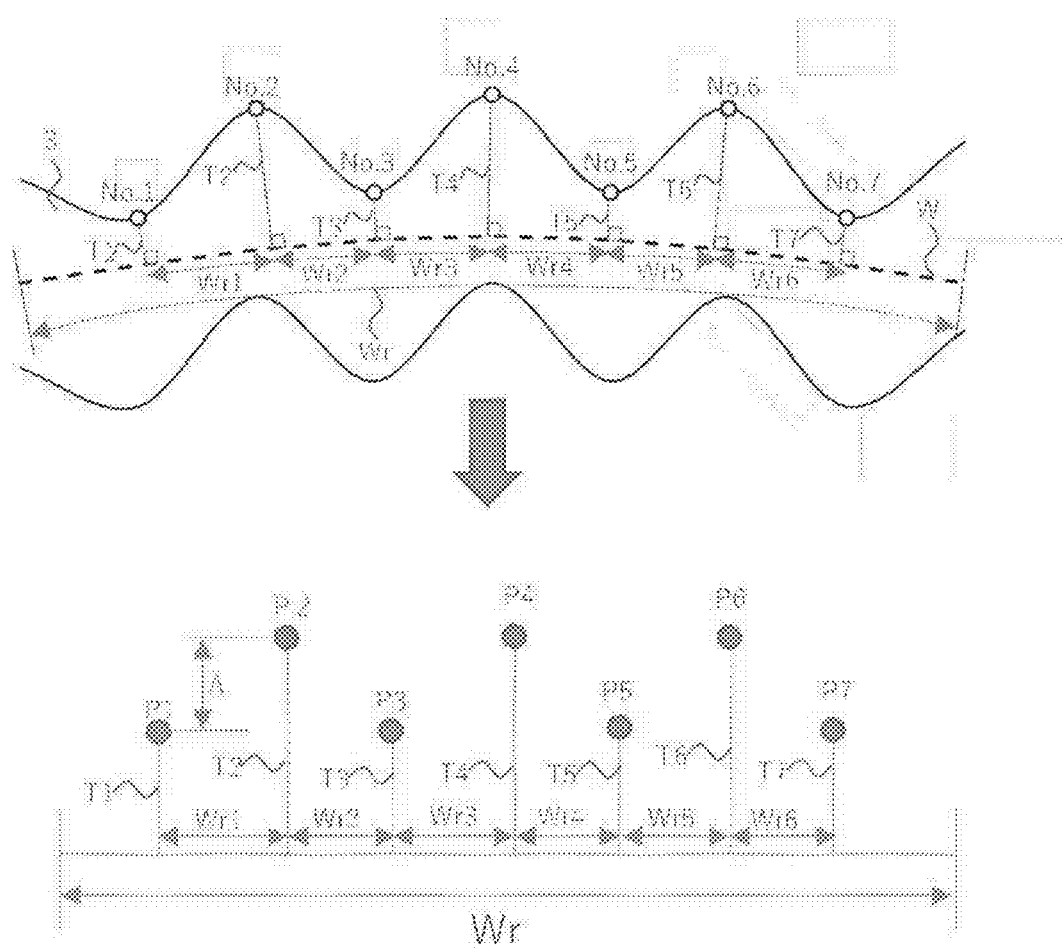
FIG. 7 is a schematic drawing for explaining a method of calculating "the number of undulations, and the distance between a peak and a valley", at the weld metal of the welded joint of the present disclosure.

Here, the method of deriving the "number of undulations, and the distance between a peak and a valley" in a case in which the weld line of the weld metal 3 is curved is described on the basis of FIG. 7.

First, the weld line W is drawn on the weld metal 3, and the weld toe of the weld metal 3 that is the object of measurement is made to face upward. In an arbitrary range of the weld metal 3 except for the respective 5 mm at the initial and final ends (at least a range of a length of 15 mm or more in the weld line direction), the number of undulations, and a length Wr of the weld line at the place where the distances between the peaks and the valleys are measured, are measured. Here, the measurement of the length Wr of the weld line may be measurement at the weld line by a device that directly measures the length, or may be derived from an image of a state in which the weld metal 3 is seen in plan view and as length $x_i$ of a curve of an x range [0,a] of an arbitrary curve f(x) by using following formula 1.

[Formula 1]

$$x_i = \int_0^a \sqrt{1+\{f'(x)\}^2}\,dx \qquad \text{formula (1)}$$

Next, all of the existing peaks and valleys are numbered from left to right by integers starting from 1. Then, at all of the numbered peaks and valleys, shortest lengths T2, T4 and T6 from the top points of the peaks to the weld line (hereinafter, the "shortest length from the top point of the peak to the weld line" is also simply called "peak shortest length"), and shortest lengths T1, T3, T5 and T7 from the bottom points of the valleys to the weld line (hereinafter, the "shortest length from the bottom point of the valley to the weld line" is also simply called "valley shortest length"), are measured. Further, the intersection points between the weld line and the lines that are the shortest lengths from the top points of the peaks to the weld line, and the intersection points between the weld line and the lines that are the shortest lengths from the bottom points of the valleys to the weld line, which intersection points are on the weld line, are plotted. Then, distances Wr1 to Wr6 between the respective plots are measured.

Next, a straight line of the same length as the length Wr of the weld line is drawn on an arbitrary recording medium (e.g., paper) (hereinafter, this straight line is also called the "simulated weld line"). Point "P1" is drawn at the upper portion of the simulated weld line and in a direction orthogonal to the simulated weld line at the same position as the valley shortest length T1 from the simulated weld line. Further, the point "P1" is considered to be the bottom point of the valley. Next, point "P2" is drawn at the right side of aforementioned "P1" at the upper portion of the simulated weld line and in a direction orthogonal to the simulated weld line at the same position as the peak shortest length T2 from the simulated weld line. Further, the point "P2" is considered to be the top point of the peak. At this time, the distance between points "P1" and "P2" along the simulated weld line is considered to be the same distance as aforementioned distance Wr1. Thereafter, by processes that are similar to "P2", drawing is carried out for "P3" and points thereafter as well. Note that this work is carried out for all of the numbered peaks and valleys.

Then, the distance, in the direction orthogonal to the simulated weld line direction, between the top point of a peak and the bottom point of a valley that are adjacent to one another is made to be "distance A, in the direction orthogonal to the weld line direction, between the top point of a peak and the bottom point of a valley that are adjacent to one another".

At least one weld toe among the weld toes at the both sides that sandwich the weld metal 3, when the weld metal is seen in plan view, it suffices for the distance between a peak and a valley to be 3.0 mm or less, and for the number of undulations to satisfy 2 to 30/15 mm.

At least the weld toe, which is on the steel base material that is at the side where the initiation of fatigue cracks of the weld toe is more of a concern, among the weld toes at the both sides that sandwich the weld metal 3, it is preferable that the distance between a peak and a valley is 3.0 mm or less, and that the number of undulations satisfies 2 to 30/15 mm.

If the side, at which the initiation of fatigue cracks of the weld toe is more of a concern, is the side where it is easy for stress to concentrate structurally at the member first, it is easy for fatigue cracks to initiate from the weld toe at that side.

A feature of only a joint portion is that it is easy for fatigue cracks of the weld toe to initiate, for example, in a case in which the shape of the weld toe is sudden, and in a case in which there are welding defects (e.g., undercutting or the like) in a vicinity of the weld toe, and in a case in which spatter adheres to a vicinity of the weld toe, and the like.

Further, examples of features of the weld toe that is at the side at which it is easy for fatigue cracks to initiate, per type of welded joint, are as follows.

In the case of lap fillet welding, it is often the case that "undulations of the weld toe of the weld metal 3" that are on the lower steel base material 1 affect the fatigue strength.

Therefore, in the present disclosure, it suffices for the number of undulations, and the distance between a peak and a valley, of the "weld toe of the weld metal 3" that is on the lower steel base material 1, to be within the above-described ranges.

In the case of a T-shaped joint, it suffices for the number of undulations, and the distance between a peak and a valley, of the "weld toe of the weld metal 3" that is on the steel base material that is at the side where the initiation of fatigue cracks is of concern, to be within the above-described ranges. Concretely, for example, it is easy for fatigue cracks to develop from the "weld toe of the weld metal 3" that is on the steel base material that is at the main sheet side (the stress transfer side), the "weld toe of the weld metal 3" that is on the steel base material that is at the side where the weld leg length is short, the "weld toe of the weld metal 3" that is on the steel base material that is at the side where the throat thickness is small, and, in a case in which the sheet thicknesses of the steel base materials are different, the "weld toe of the weld metal 3" that is on the steel base material that is at the side having a thin sheet thickness. Therefore, it suffices for the number of undulations, and the distance between a peak and a valley, of these sides to be within the above-described ranges.

In the case of butt welding, it is easy for fatigue cracks to initiate from, for example, the weld toe of the weld metal 3" that is on the steel base material that is at the side having a thin sheet thickness, in a case in which the sheet thicknesses of the steel base materials are different. Therefore, it suffices for the number of undulations, and the distance between a peak and a valley, of these sides to be within the above-described ranges.

[Chemical Composition of Weld Metal 3]

The chemical composition of the weld metal 3 is not particularly limited, but there can be exemplified a chemical composition that is structured by steel containing, in % by mass:

C: 0.01 to 0.50%
Si: 0.005 to 2.000%
Mn: 0.01 to 3.00%
P: 0.100% or less
S: 0.0500% or less Concretely, for example, as the weld metal 3, there can be exemplified a chemical composition containing C: 0.01 to 0.50%, Si: 0.005 to 2.000%, Mn: 0.01 to 3.00%, P: 0.100% or less, and S: 0.0500% or less, and arbitrary elements as needed, and the remainder is formed from Fe and impurities.

Note that the chemical composition of the weld metal 3 is the chemical composition of the interior of the weld metal 3 that is at a distance of 500 μm or more from the obverse of the weld metal 3 and the fusion line, respectively.

—C: 0.01 to 0.50%—

C is an element that ensures the strength of the weld metal 3, and, if the amount thereof is low, there are cases in which the strength of the weld metal 3 cannot be ensured. Therefore, the amount of C is preferably 0.01% or more. On the other hand, if an excessive amount of C is contained, there are cases in which hydrogen embrittlement breakage arises. Therefore, the amount of C is preferably 0.50% or less.

—Si: 0.005 to 2.000%—

Si is an element that functions to adjust the strength of and as a deoxygenation agent of the weld metal 3. In addition, therefore, if the amount of Si is lowered extremely, it leads to an increase in the cost of refining. The amount of Si is preferably 0.005% or more. On the other hand, if an excessive amount of Si is contained, the weldability deteriorates, and it is difficult to obtain the target toe shape of the weld metal 3. Therefore, the amount of Si is preferably 2.000% or less.

—n: 0.01 to 3.00%—

Mn is an element that increases the hardenability of the weld metal 3. Therefore, the amount of Mn is preferably 0.01% or more. If the amount of Mn is large, the toughness deteriorates. Therefore, the amount of Mn is preferably 3.00% or less.

—P: 0.100% or Less—

P has the effect of strengthening the weld metal 3, but markedly deteriorates the toughness of the weld metal 3. Therefore, the amount of P is preferably 0.100% or less. On the other hand, although the amount of P may be 0%, completely eliminating the P that permeates from the raw material of the steel base material or the like is economically disadvantageous. Therefore, the amount of P is preferably 0.001% or more.

—S: 0.0500% or Less—

S is an element that deteriorates the toughness of the weld metal 3 in the same way as P, and, if a large amount of S is contained, it is a cause of solidification breakage of the weld metal 3. Therefore, the amount of S is preferably 0.0500% or less. On the other hand, completely eliminating the S that permeates from the raw material of the steel base material or the like is economically disadvantageous. Therefore, the amount of S is preferably 0.0001% or more.

The chemical composition of the weld metal 3 may include one or more of the following as arbitrary elements, in % by mass, and within a range that does not affect the fatigue strength of the weld metal 3.

Ti: 0 to 0.5%
Cr: 0 to 2.0%
Mo: 0 to 1.0%
Ni: 0 to 5.0%
B: 0 to 0.01%
N: 0 to 0.01%
Al: 0 to 1.0%

Note that there are cases in which, before the weld metal 3 solidifies, the Al that is contained in the weld metal 3 oxidizes and the welding slag comes to the surface. Therefore, even if the Al that is within the steel base material enters into the weld metal 3 before the solidifying, little Al remains in the weld metal 3 after the solidifying.

<Steel Base Material>

The pair of steel base materials are steel base materials, at least one of which has a tensile strength of 780 MPa or more. A steel base material that has high tensile strength is suitable as the steel base material of, in particular, the weld joint 10 that is used for an automobile of which lightening of weight and an improvement in collision safety are strongly required. From this standpoint, it is good that both of the pair of steel base materials are steel base materials whose tensile strength is 780 MPa or more.

Note that the tensile strength is measured in accordance with JIS Z2241 (2011).

The chemical composition of the steel base material is described hereinafter, and the contents of the respective elements express the contents of the respective elements with respect to the entire mass of the steel base material.

As described above, from the standpoint of improving the fatigue strength of the weld metal 3, it is preferable that at least one of the pair of steel base materials contains Al in an amount of 0.100 to 1.000% by mass.

When welding a pair of steel base materials containing Al in an amount of 0.100% or more, at at least one of the pair of steel base materials, the viscosity of the molten metal increases, and, without being accompanied by a decrease in the throat thickness at the time of carrying out welding such as welding with weaving, wave pulse webbing or the like for example, concentrations of stress at the peaks also are greatly reduced. Due thereto, the fatigue strength of the weld metal 3 greatly improves.

On the other hand, welding a pair of steel base materials containing Al in an amount of 1.000% or less is preferable from the standpoint of ensuring the toughness of the weld metal 3.

The amount of Al is preferably 0.100 to 0.500% by mass, and is more preferably 0.200 to 0.500% by mass.

Note that, from the standpoint of improving the fatigue strength, it is preferable that both of the pair of steel base materials contain Al in an amount of 0.100 to 1.000% by mass.

Here, it could also be thought to have the welding wire contain Al, in order to increase the viscosity of the molten metal and to suppress a "decrease in the throat thickness" by the Al. However, if the welding wire is made to contain Al in the above-described range, during the welding, it is easy for oxidative consumption to occur, and the amount of Al that is contained in the weld metal is lower than in a case in which Al is added to the steel base materials. Therefore, it is preferable that Al in the above-described amount is contained in the steel base materials.

As the chemical composition of the pair of steel base materials, a chemical composition that suppresses a decrease in the "throat thickness" of the weld metal 3 and that obtains the mechanical characteristic of a tensile strength of 780 MPa or more is preferable. As an example of the chemical composition of the pair of steel base materials, there is exemplified a chemical composition that is formed from, in % by mass:

C: 0.002 to 0.400%
Si: 0.002 to 2.000%
Mn: 0.1 to 3.0%
P: 0.1% or less
S: 0.05% or less
Al: 0.100 to 0.500%
Ti: 0 to 0.5%
N: 0 to 0.01%
Cr: 0 to 2.0%
Mo: 0 to 1.0%
Ni: 0 to 5.0%
remainder: Fe and impurities The sheet thickness of the pair of steel base materials is 0.4 to 4.0 mm. If the sheet thickness of the pair of steel base materials is less than 0.4 mm, stable welding cannot be carried out, and the fatigue strength decreases.

If the sheet thickness of the pair of steel base materials exceeds 4.0 mm, welding residual stress is dominant with respect to the fatigue strength, and the effect of improving the fatigue strength by the peaks of the weld metal 3 is small.

A preferable sheet thickness of the pair of steel base materials is 0.8 to 3.2 mm.

The sheet thickness of the pair of steel base materials is a value that is measured at a position that is apart by 3 mm, in the direction orthogonal to the weld line direction, toward the base material side from the top point of an arbitrary peak that the weld toe of the welded joint has, when the weld metal is seen in a plan view. Measurement of the sheet thickness is carried out by using a contact-type displacement meter that nips the sheet in the thickness direction.

<Vickers Hardness>

The ratio of the Vickers hardness of the weld metal with respect to the Vickers hardness of the steel base materials is preferably 0.75 or more and 0.95 or less.

The ratio of the Vickers hardnesses being within the above-described range means that the hardness of the weld metal is low as compared with the steel base materials. Namely, at the time of welding in the fabrication of a welded joint at which the ratio of the Vickers hardnesses is within the above-described range, the weld metal is formed by a welding wire whose hardness is low as compared with the steel base materials. Because the cost of a welding wire having a low hardness is low, it is easy to obtain the welded joint while keeping the fabrication cost down. Therefore, due to the ratio of the Vickers hardnesses being within the above-described range, and by setting the number of undulations, and the distance between a peak and a valley, of the weld metal in the above-described ranges, it is easy to obtain a welded joint having excellent fatigue strength, while keeping the fabrication cost down.

Note that, in a case in which the Vickers hardnesses of the pair of steel base materials are respectively different, it is preferable that the ratio of the Vickers hardness of the weld metal with respect to the Vickers hardness of at least one steel base material among the pair of steel base materials is within the above-described range, and it is more preferable that the ratio of the Vickers hardness of the weld metal with respect to the Vickers hardnesses of both of the steel base materials among the pair of steel base materials is within the above-described range.

Measurement of the ratio of the Vickers hardness of the weld metal with respect to the Vickers hardness of the steel base materials is derived by the following procedure. The measurement of the Vickers hardness of the weld metal is measured at, of the welded joint, the surface that is formed by the X-axis and the Y-axis shown in FIG. 1. The Vickers hardness is measured at five or more points at positions that are 0.2 mm or more apart from the weld metal obverse (the solid line portion of the weld metal 3 shown in FIG. 1), and at positions that are 0.2 mm or more apart from the fusion line (the dotted-line portions of the weld metal 3 shown in FIG. 1), and the calculated average value of the obtained measured values is used as the Vickers hardness of the weld metal.

Next, a cross-sectional sample is collected by cutting the steel base material in the thickness direction of the steel base material at a position that is 5 mm or more apart, in the direction orthogonal to the weld direction toward the base material side, from the top point of an arbitrary peak that the weld toe of the welded joint has. The Vickers hardness of the steel base material is measured at the cut cross-section of the cross-sectional sample.

Measurement of the Vickers hardness is carried out at 5 points or more in a range that is a depth of 0.1 mm or more from the steel sheet obverse of the steel base material and is 40% or less of the sheet thickness. The calculated average value of the obtained measured values is used as the Vickers hardness of the steel base material.

By dividing the Vickers hardness of the weld metal by the Vickers hardness of the steel base material (i.e., "Vickers hardness of weld metal"/"Vickers hardness of steel base material"), the ratio of the Vickers hardness of the weld metal with respect to the Vickers hardness of the steel base material is derived.

Here, the "Vickers hardness" is measured in accordance with JIS Z 2244 (2009). The measurement conditions are that the indenting load of the indenter is 100 gf or more, the indenter is a Vickers square-based-pyramid, diamond indenter having an angle between opposing surfaces of 136°, and the indenting time is 10 s or more.

<Method of Fabricating Welded Joint>

A method of fabricating the welded joint by arc welding with weaving that satisfies the following conditions is given as an example of the method of fabricating the welded joint of the present disclosure.

(1) welding speed: 40 to 100 cm/min
(2) weaving frequency: 0.2 to 20 Hz
(3) weaving amplitude: 0.6 to 20 mm
(4) composition (% by volume) of shielding gas: $CO_2$ concentration of 20% or less or $O_2$ concentration of 8% or less, remainder: Ar
(5) welding current: 150 to 250 A First, in the method of fabricating the welded joint of the present disclosure, the welding wire is not particularly limited provided that it is a wire that satisfies the toe shape of the weld metal 3.

As an example of the chemical composition of the welding wire, there is exemplified a chemical composition that is formed from, in % by mass:
C: 0.002 to 0.400%
Si: 0.002 to 2.000%
Mn: 0.1 to 3.0%
P: 0.1% or less
S: 0.05% or less
Al: 0.1 to 1.0%
Ti: 0 to 0.5%
N: 0 to 0.01%
Cr: 0 to 2.0%
Mo: 0 to 1.0%
Ni: 0 to 5.0%
Cu: 0 to 1.0%
remainder: Fe and impurities By making the welding speed be 110 cm/min or less, the occurrence of disordering of the toe shape of the weld metal 3 is suppressed, and it is easy to obtain the target toe shape, and the fatigue strength of the weld metal 3 improves. On the other hand, by making the weld speed 40 cm/min or more, the efficiency of the welding operation improves.

Therefore, the welding speed is preferably 40 to 110 cm/min.

By making the weaving frequency be 0.2 to 20 Hz, it is easy for the "number of undulations" to be in the range of 2 to 30/15 mm.

Note that, in a case in which the welding speed is accelerated in order to make the "number of undulations" be in the range of 2 to 30/15 mm, it is preferable to raise the weaving frequency. On the other hand, in a case in which the welding speed is slowed, it is preferable to lower the weaving frequency.

Therefore, the weaving frequency is preferably 0.2 to 20 Hz.

By making the weaving amplitude be 0.6 to 20 mm, it is easy for the "distance between a peak and a valley" to be 3.0 mm or less.

Therefore, the weaving amplitude is preferably 0.6 to 20 mm.

Figure 8:
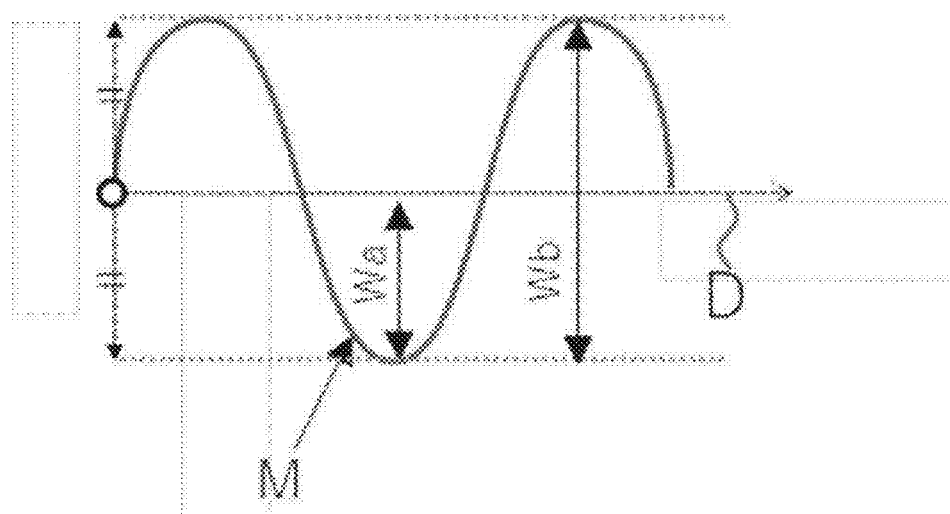
FIG. 8 is a schematic drawing for explaining the "weaving amplitude" in an example of a method of fabricating the welded joint of the present disclosure.

Here, "the weaving amplitude" is described on the basis of FIG. 8. This means the value that is two times amplitude Wa of motion M of the welding torch when weaving the welding torch. Namely, the weaving amplitude is shown by Wb in FIG. 8. Note that, in FIG. 8, D denotes the welding direction.

In the composition of the shielding gas, in a case in which the $CO_2$ concentration or the $O_2$ concentration is low, the amount of spatter decreases, disordering of the obverse of the weld metal 3 is suppressed, and it is easy to limit the starting points of fatigue cracks to the peaks.

Therefore, the composition (% by volume) of the shielding gas is preferably a $CO_2$ concentration of 20% or less or an $O_2$ concentration of 8% or less, and the remainder: Ar.

By making the welding current be 150 A or more, disordering in the welding is suppressed, and a stable shape of the weld metal 3 (weld bead shape) is obtained. On the other hand, by making the welding current be 250 A or less, it is easy to suppress the occurrence of problems such as melt-through and the like.

Therefore, the welding current is preferably made to be 150 to 250 A.

<Automobile Component>

The automobile component of the present disclosure has the welded joint of the present disclosure.

For example, the automobile component of the present disclosure has the welded joint shown in FIG. 1 to FIG. 2.

Concretely, examples of the automobile component of the present disclosure are a frame component of the vehicle body, a panel component and an undercarriage component, and concretely, a suspension arm, a suspension frame, a chassis frame, and the like that require high strength are suitably exemplified.

EXAMPLES

The present disclosure is described in further detail hereinafter by way of Examples, but the present disclosure is not limited to these Examples.

Examples

By using steel sheets that had the chemical compositions, sheet thicknesses and tensile strengths shown in Table 1 as the pair of steel base materials, lap fillet welding was carried out under the welding conditions shown in Table 3 and Table 4.

Here, the composition of the shielding gas was Ar+20% $CO_2$.

Further, wires (see Table 2) corresponding to YGW16 in JIS Z 3312 (2009) were used as the welding wire.

The 1) number of undulations (total number of peaks and valleys), and the 2) distance between a peak and a valley (the distance between the top point of a peak and the bottom point of a valley that are adjacent to one another) were investigated by the above-described methods at, of the weld toe of the weld metal of the welded sample, only the weld toe of the weld metal on the lower steel sheet. The 15 mm in a vicinity of the center of the entire length of the weld metal (the weld bead), except for the 5 mm at the initial and final ends respectively, was investigated.

At the welded sample, the Vickers hardness of the steel base materials and the Vickers hardness of the weld metal were measured in accordance with the above-described method, and the ratio of the Vickers hardness of the weld metal to the Vickers hardness of the steel base materials was derived.

A plane bending fatigue test piece was fabricated from the welded sample, and a plane bending fatigue test was carried out at an alternating load of a stress ratio R=−1. The fatigue limit was the maximum stress amplitude without breakage at 10,000,000 cycles. The maximum bending stress at the surface, without considering the concentration of stress at the smallest cross-section (width 20 mm, sheet thickness 2.9 mm) of the sample piece, was the reference for the bending stress.

The obtained results are shown in Table 3 and Table 4.

Note that the "fatigue limit improvement rate" in Table 3 and Table 4 was derived as follows. The fatigue limit improvement rate was defined as the value obtained by dividing the fatigue limit of the sample, which was welded under the condition of with weaving, by the fatigue limit of the sample, which was welded under the same welding conditions except for without weaving.

TABLE 1

| steel sheet | sheet thickness (mm) | tensile strength [MPa] | chemical composition (remainder = Fe + impurities) (% by mass) | | | | | |
|---|---|---|---|---|---|---|---|---|
| | | | C | Si | Mn | Al | P | S |
| A | 2.9 | 793 | 0.07 | 0.05 | 2.0 | 0.340 | 0.01 | 0.0008 |
| B | 2.9 | 785 | 0.04 | 0.80 | 2.2 | 0.030 | 0.01 | 0.0010 |
| C | 2.3 | 811 | 0.08 | 0.03 | 2.5 | 0.470 | 0.01 | 0.0012 |
| D | 2.9 | 637 | 0.06 | 0.33 | 1.7 | 0.027 | 0.01 | 0.0056 |
| E | 2.9 | 789 | 0.08 | 0.04 | 1.9 | 0.099 | 0.01 | 0.0025 |

TABLE 2

| | chemical composition (remainder = Fe + impurities)(% by mass) | | | | | |
|---|---|---|---|---|---|---|
| | C | Si | Mn | Cr | Mo | Ti |
| chemical composition of welding wire | 0.06 | 0.5 | 1.6 | 0 | 0 | 0.002 |

TABLE 3

| | test example | 1 | 2 | 3 | 4 | 5 | 6 | 7 |
|---|---|---|---|---|---|---|---|---|
| welding conditions | steel sheet | A | A | A | B | B | C | C |
| | weld current [A] | 235 | 235 | 225 | 235 | 235 | 183 | 183 |
| | welding speed [m/min] | 0.8 | 0.8 | 0.6 | 0.8 | 0.8 | 0.4 | 0.4 |
| | weaving frequency [Hz] | 0 | 2 | 4 | 0 | 2 | 0 | 6 |
| | weaving amplitude [mm] | 0 | 2.5 | 2 | 0 | 2.5 | 0 | 2 |
| number of undulations [number/15 mm] | | 0 | 4 | 12 | 0 | 4 | 0 | 25 |
| distance [mm] between peak and valley | | 0 | 1.24 | 0.47 | 0 | 1.22 | 0 | 0.17 |
| steel base material Vickers hardness [HV] | | 265 | | | 258 | | 272 | |
| weld metal Vickers hardness [HV] | | 223 | 225 | 219 | 217 | 218 | 218 | 215 |
| Vickers hardness ratio (weld metal/ steel base material) | | 0.842 | 0.849 | 0.826 | 0.841 | 0.845 | 0.801 | 0.790 |
| fatigue limit [MPa] | | 170 | 230 | 221 | 190 | 204 | 181 | 213 |
| fatigue limit improvement rate | | 1.00 | 1.35 | 1.30 | 1.00 | 1.07 | 1.00 | 1.18 |
| disclosed example/comparative example | | comp. ex. | discl. ex. | discl. ex. | comp. ex. | discl. ex. | comp. ex. | discl. ex. |

TABLE 4

| | test example | 8 | 9 | 10 | 11 | 12 | 13 | 14 | 15 | 16 |
|---|---|---|---|---|---|---|---|---|---|---|
| | steel sheet | A | A | A | A | A | D | D | E | E |
| welding conditions | weld current [A] | 235 | 176 | 176 | 176 | 176 | 235 | 235 | 235 | 235 |
| | welding speed [m/min] | 0.8 | 0.6 | 0.6 | 0.6 | 0.6 | 0.8 | 0.8 | 0.8 | 0.8 |
| | weaving frequency [Hz] | 0.5 | 0 | 2 | 2.5 | 3 | 0 | 2.5 | 0 | 3 |
| | weaving amplitude [mm] | 2.5 | 0 | 2.5 | 2.5 | 2.5 | 0 | 3 | 0 | 3 |
| number of undulations [number/15 mm] | | 1 | 0 | 6 | 7 | 9 | 0 | 5 | 0 | 6 |
| distance [mm] between peak and valley | | 2.5 | 0 | 0.73 | 0.57 | 0.57 | 0 | 1.0 | 0 | 1.3 |
| steel base material Vickers hardness [HV] | | | | 265 | | | | 206 | | 257 |
| weld metal Vickers hardness [HV] | | 210 | 207 | 209 | 215 | 212 | 210 | 215 | 225 | 223 |
| Vickers hardness ratio (weld metal/steel base material) | | 0.792 | 0.781 | 0.789 | 0.811 | 0.800 | 1.019 | 1.044 | 0.875 | 0.868 |
| fatigue limit [MPa] | | 165 | 154 | 208 | 242 | 207 | 156 | 165 | 183 | 224 |
| fatigue limit improvement rate | | 0.97 | 0.97 | 1.35 | 1.57 | 1.34 | 1.00 | 1.06 | 1.00 | 1.22 |
| disclosed example/comparative example | | comp. ex. | comp. ex. | discl. ex. | discl. ex. | discl. ex. | comp. ex | comp. ex | comp. ex. | discl. ex. |

From the above results, it can be understood that, in Test Examples 2 to 3, 5, 7, 10 to 12, 16, a fatigue strength that is the fatigue limit of 200 MPa or more is obtained, as compared with Test Examples 1, 4, 6, 8, 9, 13 to 15.

In particular, it can be understood that excellent fatigue strength is obtained in Test Examples 2 to 3, 7, 10 to 12 that use steel base materials containing an amount of Al in a proper range.

Explanation of main reference numerals is given hereinafter.

1, 2 steel base material
3 weld metal

The disclosure of Japanese Patent Application No. 2019-184025 filed on Oct. 4, 2019 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A welded joint comprising:
a pair of steel base materials having a sheet thickness of 0.4 to 4.0 mm, and at least one of which has a tensile strength of 780 MPa or more; and
a weld metal that welds the pair of steel base materials, wherein, when the weld metal is seen in plan view, a weld toe of the weld metal has peaks and valleys, an average distance in a direction orthogonal to a weld line direction between a top point of a peak and a bottom point of a valley that are adjacent to one another is less than or equal to 3.0 mm, and an average number of a total of peaks and valleys, at which a distance in the direction orthogonal to the weld line direction between the top point of the peak and the bottom point of the valley that are adjacent to one another is 0.1 mm to 3.0 mm, is 2 to 30/15 mm, wherein:
the peaks protrude in the direction orthogonal to the weld line direction and parallel to an obverse of the pair of steel base materials,
the valleys are recessed in the direction orthogonal to the weld line direction and parallel to the obverse of the pair of steel base materials,
the average number of a total of peaks and valleys is an average number of a total of peaks and valleys present along the weld line direction, and
the direction orthogonal to the weld line direction is a direction orthogonal to a direction parallel to a weld line and parallel to the obverse of the pair of steel base materials.

2. The welded joint of claim 1, wherein the average number of the total of the peaks and the valleys, at which the distance in the direction orthogonal to the weld line direction between the top point of the peak and the bottom point of the valley that are adjacent to one another is 0.1 mm to 3.0 mm, is 4 to 9/15 mm.

3. The welded joint of claim 1, wherein a ratio of a Vickers hardness of the weld metal with respect to a Vickers hardness of at least one of the pair of steel base materials is 0.75 or more and 0.95 or less.

4. The welded joint of claim 1, wherein at least one of the pair of steel base materials contains Al in an amount of 0.100 to 1.000% by mass.

5. An automobile component comprising the welded joint of claim 1.

6. The welded joint of claim 2, wherein a ratio of a Vickers hardness of the weld metal with respect to a Vickers hardness of at least one of the pair of steel base materials is 0.75 or more and 0.95 or less.

7. The welded joint of claim 2, wherein at least one of the pair of steel base materials contains Al in an amount of 0.100 to 1.000% by mass.

8. The welded joint of claim 3, wherein at least one of the pair of steel base materials contains Al in an amount of 0.100 to 1.000% by mass.

9. An automobile component comprising the welded joint of claim 2.

10. An automobile component comprising the welded joint of claim 3.

11. An automobile component comprising the welded joint of claim 4.

* * * * *